United States Patent [19]

Kuhns

[11] Patent Number: 5,405,473
[45] Date of Patent: Apr. 11, 1995

[54] METHOD OF LAMINATING A CUSTOMIZED PRESENTATION FOLDER

[75] Inventor: Roger J. Kuhns, Lincoln, Mass.

[73] Assignee: Avant, Inc., Concord, Mass.

[21] Appl. No.: 215,290

[22] Filed: Mar. 18, 1994

[51] Int. Cl.⁶ .................. B42D 15/00; B32B 31/20
[52] U.S. Cl. ................... 156/226; 156/227; 156/308.2; 281/29; 281/31; 281/35; 283/107; 283/109; 493/210; 493/947
[58] Field of Search ........... 156/226, 227, 204, 300, 156/308.4, 308.2; 281/29, 31, 35; 283/79, 107, 109; 493/947, 245, 254, 187, 208, 210; 40/359

[56] References Cited

U.S. PATENT DOCUMENTS

| | | | |
|---|---|---|---|
| 4,185,405 | 1/1980 | Giulie | 283/107 |
| 4,545,838 | 10/1985 | Minkus et al. | 283/109 |
| 5,042,843 | 8/1991 | Kuhns et al. | 283/109 |
| 5,090,732 | 2/1992 | Kuhns et al. | 281/29 |
| 5,100,181 | 3/1992 | Nathans et al. | 281/29 |
| 5,294,279 | 3/1994 | Kuhns et al. | 156/226 |

*Primary Examiner*—Michael W. Ball
*Assistant Examiner*—Michele K. Yoder
*Attorney, Agent, or Firm*—Joseph S. Iandiorio; Kirk Teska

[57] ABSTRACT

A method of laminating a customized presentation folder including placing a plastic cover sheet on one cover face of the folder and sealing the bottom of the plastic cover sheet thereon, inserting an insert sheet behind the plastic cover sheet in-between it and the cover face, inverting the folder and urging the folder, bottom first, through a laminator for fabricating a customized presentation folder in which any skinning that occurs on the inside of the folder is hidden.

6 Claims, 2 Drawing Sheets

METHOD OF LAMINATING A CUSTOMIZED PRESENTATION FOLDER

FIELD OF INVENTION

This invention relates to a method of laminating a customized presentation folder which prevents skinning on the inside face of the folder during lamination.

BACKGROUND OF INVENTION

Presentation folders are used to forward information about a company, firm, or business. Customized presentation folders are those presentation folders whose appearance makes them readily identifiable with a particular company, firm, or business. A law firm, for example, may transmit its advertising material in a folder which bears the firm's name and logo. Presentation folders are made of rectangular paper stock having a thickness of 10 mils. A centrally positioned vertical fold separates the left hand portion from the right hand portion, at least one portion usually has a pouch or a pocket formed at the bottom of the folder for containing sales literature and the like. Customized indicia such as a company logo, photograph, and a description of the literature within the folder and related information is sometimes printed on the front cover of the folder by a print shop. Sending the folder to an outside print shop, however, can result in detrimental delays, and furthermore is a costly process, particularly if only a small number of folders are to be printed.

In U.S. Pat. No. 5,090,732, incorporated herein by reference, a presentation folder is featured whereby a thin sheet including customizing indicia (printed quickly and economically on a desk top publishing PC program) is heat laminated to the front face or faces of the folder. A plastic sheet is heat sealed at the top thereof to the top of one face, the indicia bearing sheet is placed behind the plastic cover sheet, and the folder is turned inside out and laminated.

Some folders come from a distributor with plastic coating or plastic backing sheets applied to the inside faces of the folder (the sides opposite the outside where the indicia bearing sheets are later laminated). Or, as was discussed in U.S. Pat. No. 5,090,732, a plastic backing sheet can be applied to counter any warpage which occurs when only one side of the folder has plastic laminated to it.

It was found, however, that while customizing such folders and laminating indicia beating sheets to the cover faces, skinning of the plastic coating or laminated backing sheet on the inside faces sometimes occurs when the folder is turned inside out to facilitate laminating the indicia beating sheet to the outside of the folder.

Such skinning or separation of the plastic coating or backing sheet from a portion of the paper folder results in a unsightly appearance and a presentation folder which is unsuitable for distribution.

SUMMARY OF INVENTION

It is therefore an object of this invention to provide a method of laminating a customization presentation folder.

It is a further object of this invention to provide such a method of laminating a customization presentation folder which results in a professional appearance and a presentation folder which is suitable for distribution.

It is a further object of this invention to provide such a method of laminating a customization presentation folder in which any skinning that occurs during lamination is hidden from view.

This invention results from the realization that instead of spot welding the plastic cover sheet which is laminated over the indicia bearing sheet at the top of the front cover of the folder and running the folder through a laminator top first, the plastic cover sheet can be sealed to the bottom of the front cover and the folder can be run through a laminator bottom first and that way any skinning during lamination will occur on what ultimately becomes the inside of the pocket of the folder and therefore is hidden from view.

This invention features a method of laminating a customized presentation folder comprising providing a folder including right and left sides joined by a fold forming cover faces on the outside of the folder and inside faces on the inside of the folder and at least one pocket forming flap foldably affixed to the bottom of at least one of the inside faces; placing a plastic cover sheet on at least one said cover face and sealing the bottom of the plastic cover sheet thereon; inserting an insert sheet behind the plastic cover sheet in-between it and the cover face; inverting the folder and folding the right and left sides together enveloping the plastic sheet and the insert sheet inside thereof; urging the folder, flap first, through a laminator for fabricating a customized presentation folder in which any skinning that occurs on the inside of the folder is hidden by the pocket forming flap.

There may be two pocket forming flaps, one foldably affixed to each inside face and one pocket forming flap may be detachable. The method further includes securing the pocket forming flap to the inside face of the folder forming a pocket thereon and placing a plastic cover sheet on each cover face and inserting an insert sheet behind each plastic cover sheet for a customized presentation folder with indicia on each cover sheet.

DISCLOSURE OF PREFERRED EMBODIMENT

Other objects, features and advantages will occur to those skilled in the art from the following description of a preferred embodiment and the accompanying drawings, in which.

Figure 1:
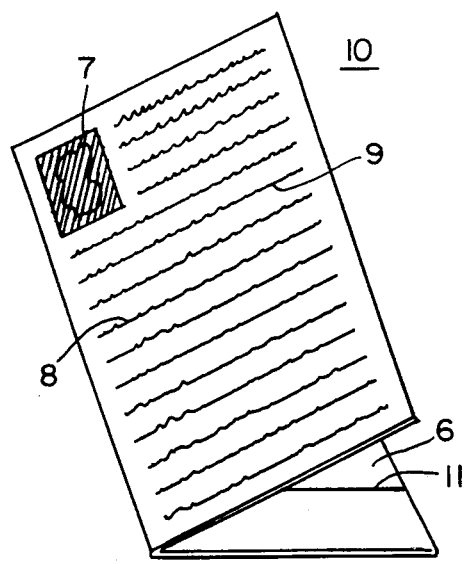
FIG. 1 is a schematic view of a customized presentation folder fabricated according to the methodology of this invention.

Presentation folder 10, FIG. 1 includes indicia bearing sheets including advertising such as photo 7 and writing 9 on the outside cover face thereof and at least one pocket 11 on the inside 6 for holding papers, advertising material and the like.

Shown inside out in FIG. 2, folder 10 includes right 12, and left 14, sides joined by fold 16 and pocket forming folding flaps 18 and 20 on the bottom thereof as shown although there may be only one flap on one side or the flaps may be detachably affixed to the inside faces of the folder as shown at 21 for flap 20 and then later removed in the final assembly. Flaps 18 and 20 include folds 24 and 26 for securing them about the inside of folder 10 as explained below.

Figure 3:
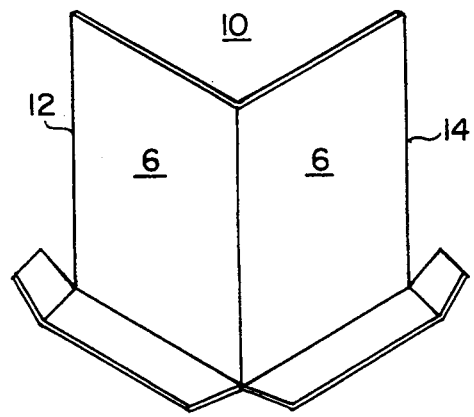
FIG. 3 is a schematic view of the inside faces of the customized presentation folder of FIG. 2.
Figure 4:
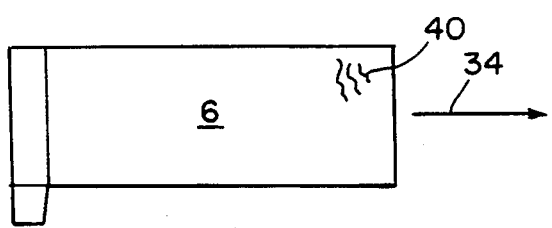
FIG. 4 is a schematic side view of a presentation folder laminated according to the prior art methodology.

Plastic cover sheets 20 and 20' seal in indicia bearing sheets 22 and 22' on left and right sides 12 and 14 of cover faces 8 and 8' respectively. The inside of folder 10 is shown in FIG. 3 and includes plastic coated inside faces 6 and 6' respectively. In the prior art methodology, the tops 28 and 28' of the plastic cover sheets 20 and 20' are tack welded to right 12 and left 14 sides of folder 10 on cover faces 8 and 8', the folder was folded together inside out as shown in FIG. 4, and run through a laminator (hot melt process) top first in the direction shown by arrow 34.

The result was often skinning as shown at 40 of the plastic coating on an inside face 6 of the folder. Such presentation folders where the plastic coating is skinned or separated from the paper were unsightly and non-professional.

Figure 2:
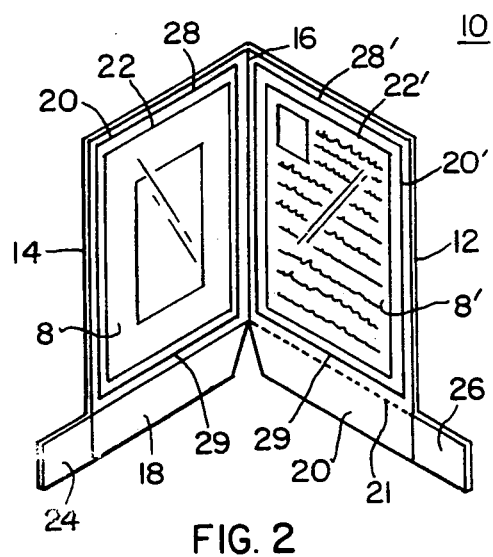
FIG. 2 is a schematic view of a customized presentation folder according to this invention showing the outside cover sheets prior to lamination.
Figure 5:
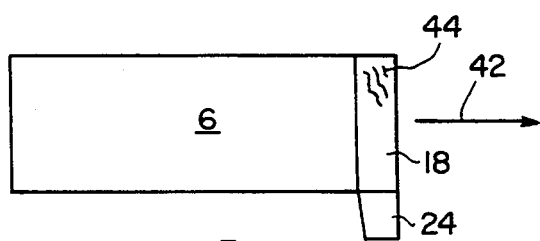
FIG. 5 is a schematic side view of a presentation folder laminated in accordance with the method of this invention.
Figure 6:
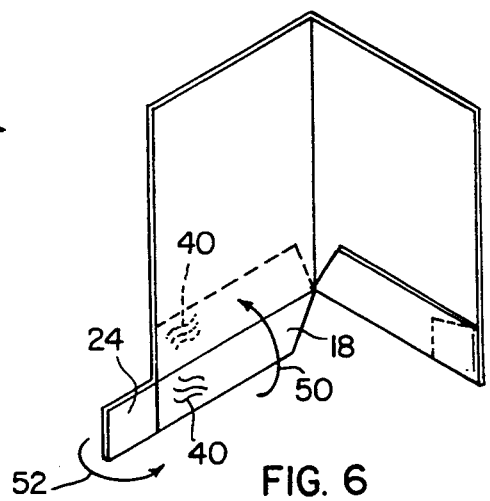
FIG. 6 is a schematic view of a customized presentation folder after lamination but prior to final assembly according to this invention.

In this invention the inventors found that this problem was overcome by tack welding the bottoms 29 and 29' of plastic cover sheets 20 and 20', FIG. 2 and then running the folder inside out bottom first through a laminator in the direction shown by arrow 42, FIG. 5. Then, if any skinning occurs as shown at 44, it is located on the inside of flap 24. That way, when the folder is finally assembled as shown in FIG. 6, skinning 44 is hidden when flap 24 is folded in the direction shown by arrow 50 after tab fold 24 is brought inward as shown by arrow 52.

FIGS. 7A–7G illustrate the method of laminating the customized presentation folder according to this invention. Folder 70, FIG. 7A includes left side 72 and right side 74 shown with outside faces 76 and 76' facing outward as shown. Flaps 78 and 78' will ultimately fold and fix into place as pockets on the inside of the folder. Folds 80 and 80' include adhesive sections 82 and 82', respectively, for locking flap 78 and 78' in place as pockets.

Figure 7A:
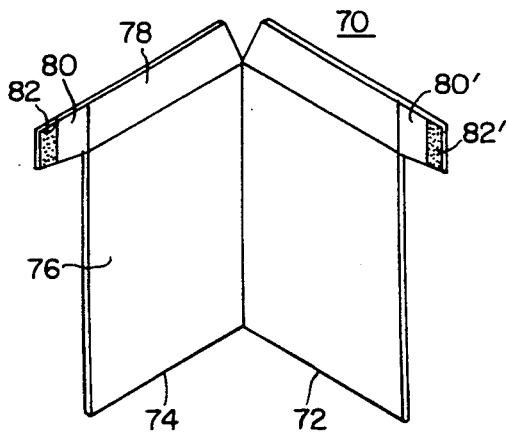
FIGS. 7A–7G are schematic views showing the method steps of laminating a customized presentation folder according to this invention.
Figure 7D:
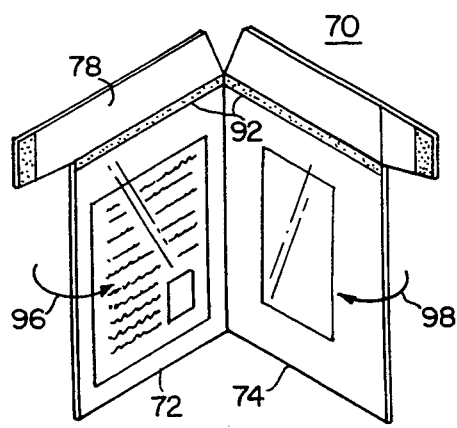
Figure 7B:
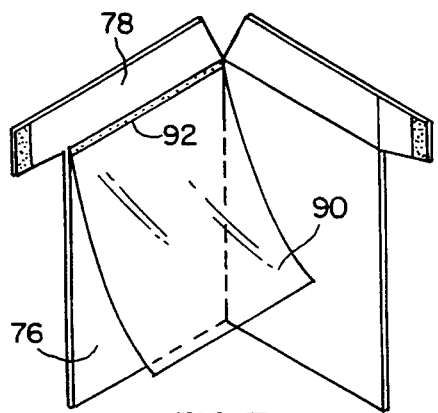
Figure 7E:
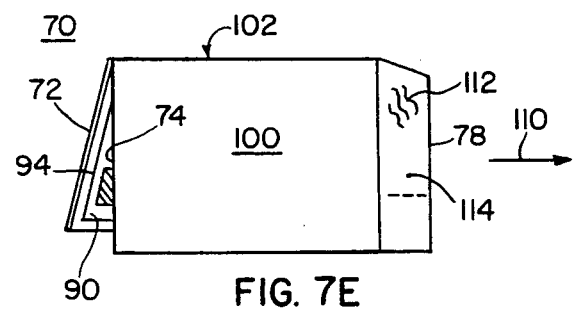

In accordance with this invention, plastic cover sheet 90, FIG. 7B is placed on face 76 by tack welding it on cover face 76 at the bottom thereof as shown at 92.

Figure 7C:
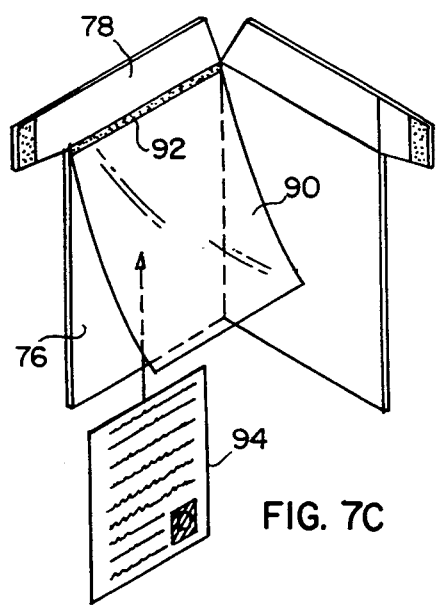
Figure 7F:
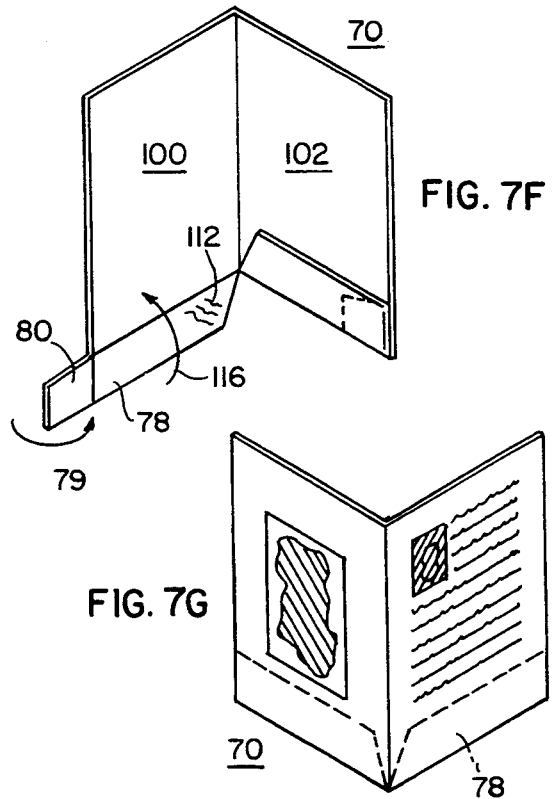

Next, indicia bearing insert sheet 94, FIG. 7C is inserted behind plastic sheet 90 in between it and cover face 76. Then folder 70, FIG. 7D is inverted and right side 70 and left side 72 are brought together in the direction indicated by arrows 96 and 98. Plastic cover sheet 90, FIG. 7E, and indicia bearing sheet 94, are now enveloped between left side 72 and right side 74 of the folder and the inside faces 100 and 102 are actually on the outside of folder 70. Folder 70 is then urged through a laminator in the direction shown by arrow 110, flap 78 first. That way, any skinning which occurs as shown at 112 will occur on the inside 114 of flap 78. Then, during final assembly, FIG. 7F, flap 78 is folded upward in the direction shown by arrow 116, after flap 80 is folded in place about flap 78 in the direction shown by arrow 79 to form a pocket about inside face 100.

Figure 7G:
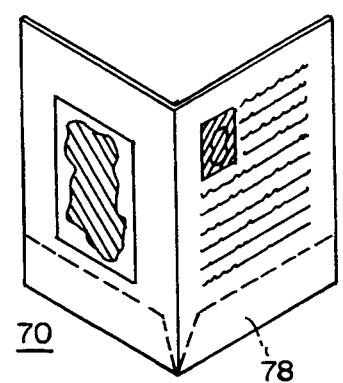

In its final configuration, presentation folder 70, FIG. 7G will not have any visible skinning since any skinning that occurs will be located on the inside unseen portion of flap 78. A presentation folder fabricated according to the methodology of this invention will therefore be professional in appearance and suitable for distribution.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

1. A method of laminating a customized presentation folder comprising: providing a folder including right and left sides joined by a fold forming cover faces on the outside of the folder and inside faces on the inside of the folder and at least one pocket forming flap foldably affixed to the bottom of at least one of said inside faces;

placing a plastic cover sheet on at least one said cover face and sealing the bottom of the plastic cover sheet thereon;

inserting an insert sheet behind said plastic cover sheet in-between said plastic cover sheet and said cover face;

inverting the folder and folding said right and left sides together enveloping said plastic sheet and said insert sheet inside thereof;

urging said folder, flap first, through a laminator for fabricating a customized presentation folder in which any skinning that occurs on the inside of the folder is hidden by said pocket forming flap.

2. The method of claim 1 in which there are two pocket forming flaps, one foldably affixed to each said inside face.

3. The method of claim 1 in which said pocket forming flap is detachable.

4. The method of claim 1 further including securing said pocket forming flap to the inside face of the folder forming a pocket thereon.

5. The method of claim 1 including placing a plastic cover sheet on each said cover face.

6. The method of claim 5 including inserting an insert sheet behind each said plastic cover sheet.

* * * * *